United States Patent
Todd et al.

(10) Patent No.: US 11,507,540 B1
(45) Date of Patent: Nov. 22, 2022

(54) DECENTRALIZED FILE SYSTEM AND MESSAGE BUS ARCHITECTURE FOR PROCESSING TRAINING SETS IN MULTI-CLOUD COMPUTING ENVIRONMENT

(71) Applicant: EMC IP Holding Company LLC, Hopkinton, MA (US)

(72) Inventors: Stephen J. Todd, Shrewsbury, MA (US); Kun Wang, Beijing (CN); Layne Lin Peng, Shanghai (CN); Pengfei Wu, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 311 days.

(21) Appl. No.: 15/897,771

(22) Filed: Feb. 15, 2018

(51) Int. Cl.
  *G06F 16/00* (2019.01)
  *G06F 16/176* (2019.01)
  *G06F 13/368* (2006.01)
  *G06F 16/182* (2019.01)

(52) U.S. Cl.
  CPC .......... *G06F 16/176* (2019.01); *G06F 13/368* (2013.01); *G06F 16/1824* (2019.01)

(58) Field of Classification Search
  CPC ........................... G06F 16/176; G06F 16/1824
  USPC ........................................................ 707/827
  See application file for complete search history.

(56) References Cited

U.S. PATENT DOCUMENTS

| | | | | |
|---|---|---|---|---|
| 6,992,978 B1 * | 1/2006 | Humblet | .................. | H04L 45/28 370/227 |
| 9,967,334 B2 * | 5/2018 | Ford | .................. | H04L 41/0806 |
| 10,075,298 B2 * | 9/2018 | Struttmann | ........... | H04L 9/3236 |
| 10,210,115 B2 * | 2/2019 | MacKenzie | ............. | G06F 13/36 |
| 10,310,760 B1 * | 6/2019 | Dreier | ...................... | G06F 13/42 |
| 10,389,602 B2 * | 8/2019 | Chang | ................. | H04L 41/5045 |
| 10,496,926 B2 * | 12/2019 | Florissi | .................. | G06N 5/022 |
| 10,509,684 B2 * | 12/2019 | Florissi | ............... | H04L 63/0407 |
| 10,515,097 B2 * | 12/2019 | Florissi | .................. | G06F 16/27 |
| 10,567,234 B1 * | 2/2020 | Todd | ...................... | H04L 67/10 |

(Continued)

OTHER PUBLICATIONS

Satoshi Nakamoto, "Bitcoin: A Peer-to-Peer Electronic Cash System," www.bitcoin.org, 2008.

(Continued)

*Primary Examiner* — Ashish Thomas
*Assistant Examiner* — Rezwanul Mahmood
(74) *Attorney, Agent, or Firm* — Ryan, Mason & Lewis, LLP

(57) ABSTRACT

In a multi-cloud computing environment comprising a plurality of cloud platforms, wherein one cloud platform is a source of a model and a data set and further wherein the model is to be executed against the data set on one or more of the other cloud platforms, the method maintains a decentralized architecture comprising a file system and a message bus, wherein the file system comprises a plurality of decentralized file system nodes corresponding to the plurality of cloud platforms, and the message bus comprises a plurality of decentralized message bus nodes corresponding to the plurality of cloud platforms. Further, the method manages sharing of the model and the data set via at least a portion of the decentralized file system nodes and manages messaging related to execution of the model against the data set via at least a portion of the decentralized message bus nodes.

20 Claims, 10 Drawing Sheets

(56) References Cited

U.S. PATENT DOCUMENTS

| | | | |
|---|---|---|---|
| 10,587,413 B1* | 3/2020 | Todd | H04L 9/50 |
| 10,698,879 B1* | 6/2020 | Todd | H04L 67/1097 |
| 10,824,740 B2* | 11/2020 | Wu | G06F 21/602 |
| 10,833,960 B1* | 11/2020 | Ranchal | G06Q 20/145 |
| 10,841,079 B1* | 11/2020 | Todd | H04L 9/3239 |
| 10,841,237 B2* | 11/2020 | Todd | H04L 47/70 |
| 10,855,758 B1* | 12/2020 | O'Connell | H04L 67/1095 |
| 10,922,304 B1* | 2/2021 | Todd | G06F 11/1464 |
| 10,924,361 B2* | 2/2021 | Todd | H04L 67/567 |
| 10,956,377 B2* | 3/2021 | Todd | G06F 16/29 |
| 11,010,265 B2* | 5/2021 | Wu | G06F 11/2094 |
| 11,025,626 B1* | 6/2021 | Todd | H04L 9/3297 |
| 11,038,891 B2* | 6/2021 | Wu | H04L 9/006 |
| 11,128,463 B1* | 9/2021 | Thompson | G16Y 40/10 |
| 11,164,115 B1* | 11/2021 | Todd | H04L 9/3239 |
| 11,334,456 B1* | 5/2022 | Natanzon | G06F 11/1076 |
| 11,341,009 B1* | 5/2022 | Wu | G06F 16/137 |
| 2011/0137991 A1* | 6/2011 | Russell | G06Q 10/06 709/204 |
| 2012/0266156 A1* | 10/2012 | Spivak | H04L 47/70 717/172 |
| 2015/0347542 A1* | 12/2015 | Sullivan | G06F 16/2455 707/602 |
| 2016/0055045 A1* | 2/2016 | Souza | G06F 11/0712 714/57 |
| 2016/0147952 A1* | 5/2016 | Garcia | G16H 40/67 705/2 |
| 2016/0171682 A1* | 6/2016 | Abedini | G06K 9/6254 382/132 |
| 2016/0300142 A1* | 10/2016 | Feller | G06Q 10/06395 |
| 2016/0357778 A1* | 12/2016 | MacKenzie | G06F 13/36 |
| 2016/0378450 A1* | 12/2016 | Fu | H04L 67/10 717/177 |
| 2017/0013046 A1* | 1/2017 | Flynn | H04L 67/01 |
| 2017/0257432 A1* | 9/2017 | Fu | H04L 67/34 |
| 2017/0357532 A1* | 12/2017 | Miraftabzadeh | H04L 41/40 |
| 2018/0114334 A1* | 4/2018 | Desai | G06K 9/6271 |
| 2018/0165386 A1* | 6/2018 | Soundiramourthy | H04L 67/562 |
| 2018/0184232 A1* | 6/2018 | Maitra | H04L 67/125 |
| 2018/0240191 A1* | 8/2018 | Aronson | G06Q 40/06 |
| 2018/0264347 A1* | 9/2018 | Tran | A63B 43/004 |
| 2018/0308072 A1* | 10/2018 | Smith | G06Q 20/02 |
| 2018/0375840 A1* | 12/2018 | Moy | H04L 67/01 |
| 2019/0026839 A1* | 1/2019 | Drangmeister | G06Q 40/125 |
| 2019/0065353 A1* | 2/2019 | Tammariello | G06F 11/3688 |
| 2019/0079744 A1* | 3/2019 | Bosch | G06F 8/60 |
| 2019/0087239 A1* | 3/2019 | Adibowo | G06N 20/20 |
| 2019/0102389 A1* | 4/2019 | LeGault | G06F 16/221 |
| 2019/0238486 A1* | 8/2019 | Zizka | H04L 51/02 |
| 2019/0318012 A1* | 10/2019 | Danilov | G06N 5/022 |
| 2019/0325044 A1* | 10/2019 | Gray | G06Q 20/3829 |
| 2019/0325155 A1* | 10/2019 | Wu | G06F 16/27 |
| 2019/0327180 A1* | 10/2019 | Todd | H04L 41/042 |
| 2019/0349426 A1* | 11/2019 | Smith | H04L 69/18 |
| 2019/0358515 A1* | 11/2019 | Tran | H04L 9/3236 |
| 2019/0361917 A1* | 11/2019 | Tran | G06Q 20/308 |
| 2019/0372762 A1* | 12/2019 | Shainski | H04L 9/0643 |
| 2020/0019626 A1* | 1/2020 | Todd | G06F 16/29 |
| 2020/0021444 A1* | 1/2020 | Young | G16C 20/90 |
| 2020/0023812 A1* | 1/2020 | Hassani | H04L 63/0861 |
| 2020/0034548 A1* | 1/2020 | Wu | G06F 21/64 |
| 2020/0058381 A1* | 2/2020 | Patel | G16H 10/60 |
| 2020/0089509 A1* | 3/2020 | Arya | G06F 9/4482 |
| 2020/0117690 A1* | 4/2020 | Tran | G06F 16/90332 |
| 2020/0137064 A1* | 4/2020 | Wu | G06F 16/182 |
| 2020/0201827 A1* | 6/2020 | Chacko | H03M 13/373 |
| 2020/0219088 A1* | 7/2020 | Dhingra | G06F 21/64 |
| 2020/0225655 A1* | 7/2020 | Cella | G05B 23/024 |
| 2020/0233760 A1* | 7/2020 | Wu | G06F 11/2056 |
| 2020/0236168 A1* | 7/2020 | Todd | H04L 67/12 |
| 2020/0242200 A1* | 7/2020 | Todd | G06F 16/182 |
| 2020/0302496 A1* | 9/2020 | Todd | G06Q 30/0282 |
| 2020/0313982 A1* | 10/2020 | Todd | H04L 41/5006 |
| 2020/0348662 A1* | 11/2020 | Cella | H04B 17/309 |
| 2020/0351323 A1* | 11/2020 | Gong | G06F 16/176 |
| 2021/0014065 A1* | 1/2021 | Gourisetti | H04L 9/3236 |
| 2021/0019303 A1* | 1/2021 | Gangwar | G06F 16/2365 |
| 2021/0056141 A1* | 2/2021 | Wojcik | G06F 16/9038 |
| 2021/0157312 A1* | 5/2021 | Cella | G05B 23/0289 |
| 2021/0294805 A1* | 9/2021 | Damodaran | G06F 16/24558 |
| 2021/0366586 A1* | 11/2021 | Ryan | G06Q 20/389 |
| 2021/0374125 A1* | 12/2021 | Kumar | H04L 9/3297 |
| 2021/0374154 A1* | 12/2021 | Kumar | H04L 9/3239 |
| 2022/0067738 A1* | 3/2022 | Fang | G06Q 20/0655 |
| 2022/0067752 A1* | 3/2022 | Fang | G06N 20/00 |
| 2022/0108262 A1* | 4/2022 | Cella | G05B 19/41885 |
| 2022/0129257 A1* | 4/2022 | Touati | G06F 16/2315 |
| 2022/0141198 A1* | 5/2022 | Lundgren | H04L 63/0421 713/164 |
| 2022/0156665 A1* | 5/2022 | Beth | B60W 60/001 |
| 2022/0207119 A1* | 6/2022 | Andon | G06F 16/2365 |

OTHER PUBLICATIONS

Juan Benet, "IPFS-Content Addressed, Versioned, P2P File System," arxiv.org/abs/1407.3561, 2014.

* cited by examiner

900

902 — IN A MULTI-CLOUD COMPUTING ENVIRONMENT COMPRISING A PLURALITY OF CLOUD PLATFORMS, WHEREIN ONE CLOUD PLATFORM OF THE PLURALITY OF CLOUD PLATFORMS IS A SOURCE OF A MODEL AND A DATA SET AND FURTHER WHEREIN THE MODEL IS TO BE EXECUTED AGAINST THE DATA SET ON ONE OR MORE OF THE OTHER CLOUD PLATFORMS OF THE PLURALITY OF CLOUD PLATFORMS, MAINTAIN A DECENTRALIZED ARCHITECTURE COMPRISING A FILE SYSTEM AND A MESSAGE BUS, WHEREIN THE FILE SYSTEM COMPRISES A PLURALITY OF DECENTRALIZED FILE SYSTEM NODES CORRESPONDING TO THE PLURALITY OF CLOUD PLATFORMS, AND THE MESSAGE BUS COMPRISES A PLURALITY OF DECENTRALIZED MESSAGE BUS NODES CORRESPONDING TO THE PLURALITY OF CLOUD PLATFORMS

904 — MANAGE SHARING OF THE MODEL AND THE DATA SET VIA AT LEAST A PORTION OF THE DECENTRALIZED FILE SYSTEM NODES AND MANAGE MESSAGING RELATED TO EXECUTION OF THE MODEL AGAINST THE DATA SET VIA AT LEAST A PORTION OF THE DECENTRALIZED MESSAGE BUS NODES

DECENTRALIZED FILE SYSTEM AND MESSAGE BUS ARCHITECTURE FOR PROCESSING TRAINING SETS IN MULTI-CLOUD COMPUTING ENVIRONMENT

FIELD

The field relates generally to multi-cloud computing environments, and more particularly to techniques for providing a file system and message bus for processing of training data sets in such multi-cloud computing environments.

BACKGROUND

Enterprises typically utilize a cloud computing environment to manage their data. One or more cloud platforms that are part of this environment may be within the exclusive control and management of the enterprise, and therefore are considered "private clouds" (or private cloud platforms). On the other hand, the cloud computing environment can include one or more cloud platforms that can be used by multiple enterprises, and not necessarily controlled or managed by any of the multiple enterprises but rather are controlled and managed by one or more third-party cloud providers. Such cloud platforms are typically considered "public clouds" (or public cloud platforms). Examples of public clouds include, but are not limited to, Amazon Web Services® (AWS), Google Compute Engine® (GCE), and Windows Azure® Services platforms. More typically, enterprises may choose to host their data (as well as applications, workloads, services, etc.) on a combination of private and public clouds that form a multi-cloud computing environment. One or more clouds may also be referred to as a "data center." Alternatively, multiple data centers could be implemented in a single cloud.

It is common that an enterprise may desire to deploy and execute a model (e.g., a training model) that is targeted towards a data set (e.g., training data set). By way of example only, the model could be an analytic model that is run on some data set. For example, in a retail use case, the training model could be an algorithm that receives customer purchase data (training data) and tests revenue improvement techniques. Further, in a medical use case, the training data could be physiological data obtained from one or more individuals wearing physiological monitor/sensors. The model that runs on such physiological data could be an algorithm used by an insurance carrier to make insurance policy decisions. Still further, in a traffic control use case, an algorithm (training model) could be run on global positioning system (GPS) coordinates for vehicles (training data) to test ways to ease traffic congestion. In all of these illustrative use cases, a training model is run against a set of training data.

While the enterprise may typically store and maintain the training model and the training data set in a private cloud environment, it is typically desirable to execute the model against the data set in a public cloud environment. However, managing the deployment of the model and data set to the public cloud environment for execution can present many challenges.

SUMMARY

Embodiments of the invention provide a decentralized file system and message bus architecture for processing training data sets in multi-cloud computing environments.

For example, in one embodiment, a method comprises the following steps. In a multi-cloud computing environment comprising a plurality of cloud platforms, wherein one cloud platform of the plurality of cloud platforms is a source of a model and a data set and further wherein the model is to be executed against the data set on one or more of the other cloud platforms of the plurality of cloud platforms, the method maintains a decentralized architecture comprising a file system and a message bus, wherein the file system comprises a plurality of decentralized file system nodes corresponding to the plurality of cloud platforms, and the message bus comprises a plurality of decentralized message bus nodes corresponding to the plurality of cloud platforms. Further, the method manages sharing of the model and the data set via at least a portion of the decentralized file system nodes and manages messaging related to execution of the model against the data set via at least a portion of the decentralized message bus nodes.

Advantageously, illustrative embodiments provide improved techniques for managing the deployment of a training model and training data set to a public cloud environment for execution.

These and other features and advantages of the invention will become more readily apparent from the accompanying drawings and the following detailed description.

BRIEF DESCRIPTION OF THE DRAWINGS

FIG. 9 illustrates a methodology for providing a decentralized file system and message bus architecture in a multi-cloud training system, according to an illustrative embodiment.

DETAILED DESCRIPTION

Illustrative embodiments will be described herein with reference to exemplary information processing systems (referred to as training systems) and associated host devices, storage devices and other processing devices. It is to be appreciated, however, that embodiments are not restricted to use with the particular illustrative system and device configurations shown. Accordingly, the terms "information processing system" and "training system" as used herein are intended to be broadly construed, so as to encompass, for example, processing systems comprising cloud computing and storage systems, as well as other types of processing systems comprising various combinations of physical and virtual computing resources. An information processing system or training system may therefore comprise, for example, a cloud infrastructure hosting multiple tenants that share cloud computing resources. Such systems are considered examples of what are more generally referred to herein as cloud computing environments. A cloud computing environment with multiple cloud platforms is referred to as a "multi-cloud computing environment." As mentioned above, enterprises may desire to deploy and execute a training model against some training data on such a multi-cloud computing environment. The training system is referred to as a "multi-cloud training system." The term "enterprise" as used herein is intended to be broadly construed, and may comprise, for example, one or more businesses, one or more corporations or any other one or more entities, groups, or organizations. An "entity" as illustratively used herein may be a person or system.

Figure 1:
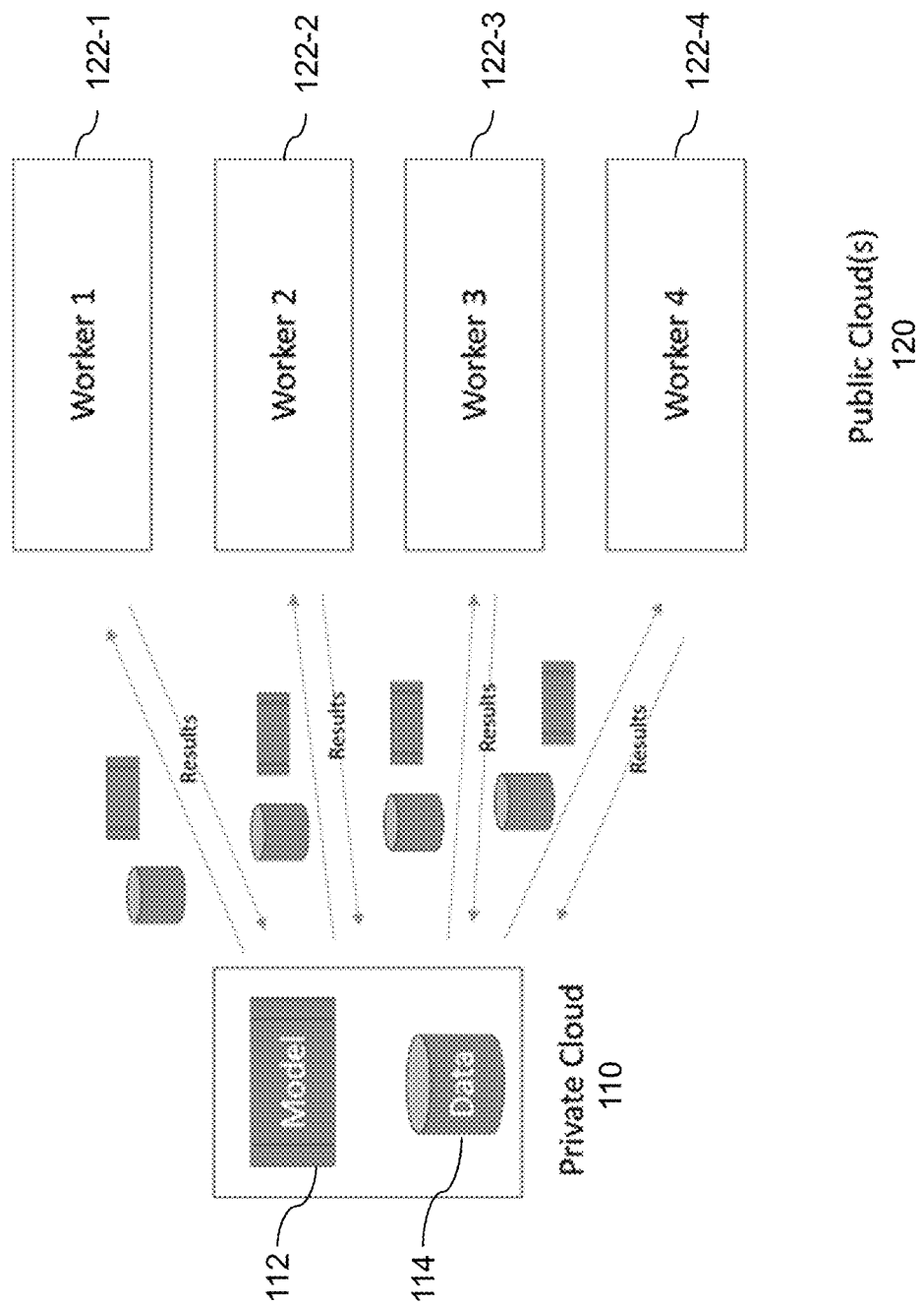
FIG. 1 illustrates a multi-cloud training system with which one or more illustrative embodiments may be implemented.

FIG. 1 illustrates a multi-cloud training system 100 with which one or more illustrative embodiments may be implemented. As shown, a private cloud platform 110 associated with an enterprise stores a training model 112 and a training data set 114. The enterprise seeks to run the training model 112 against the training data set 114 in a public cloud environment 120 via a number of separate worker processes, e.g., workers 122-1, 122-2, 122-3 and 122-4. The workers can all be located in a single public cloud or distributed across multiple cloud platforms (which is illustrated in more detail and discussed below in the context of FIG. 2).

In order for each of the workers 122-1, 122-2, 122-3 and 122-4 to run the training model 112 against the training data set 114, the training model 112 and the training data set 114 must be transferred to the public cloud environment 120 (as graphically illustrated in FIG. 1). This transfer may occur in any number of ways further described below. When each worker completes its task, the worker returns the results to a master node that is running within the private cloud platform 110. As further explained below, these workers could be inefficient in their processing of the training data set 114 when they all run in the context of one public cloud platform.

The workers 122-1, 122-2, 122-3 and 122-4 could also experience significantly more inefficiency when they are distributed across multiple clouds. The decision to run workers across cloud platforms could occur for any number of reasons including, but not limited to:

(i) A given cloud may not have enough compute, network, and or storage resources for all workers.

(ii) The model owner may wish to configure the workers across multiple clouds for availability/performance reasons.

(iii) The model owner may wish to configure the workers across multiple clouds for evaluation purposes (evaluating the performance of multiple clouds, e.g., a bake-off).

(iv) The model owner may not wish to have all the data processed on one cloud for security reasons.

(v) The model owner may wish to quickly deploy all workers to a different cloud for cost and/or speed purposes.

Figure 2:
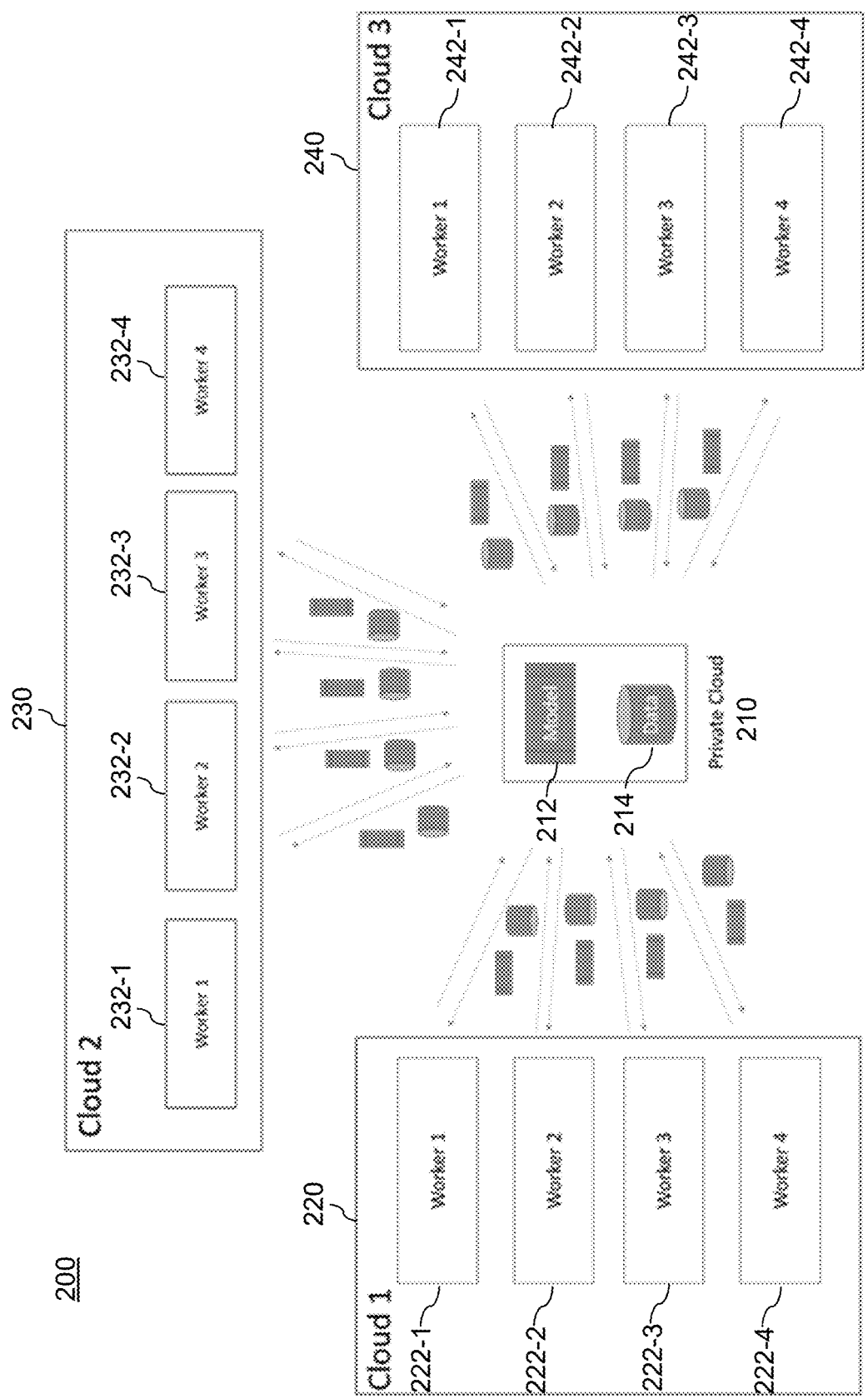
FIG. 2 illustrates a multi-cloud training system with multiple public cloud platforms with which one or more illustrative embodiments may be implemented.

In addition, an enterprise may wish to achieve fluidity in their choice of public cloud providers. FIG. 2 illustrates a multi-cloud training system 200 with multiple public cloud platforms with which one or more illustrative embodiments may be implemented. More particularly, FIG. 2 highlights the complicated environment that arises when an enterprise wishes to use multiple public cloud providers in order to have a choice of analytic platform and/or to evaluate providers against one another. It is to be understood that the multi-cloud training system could have more or less cloud platforms than are shown in FIG. 2.

As shown in FIG. 2, a private cloud platform 210 associated with an enterprise stores a training model 212 and a training data set 214. The enterprise seeks to run the training model 212 against the training data set 214 on multiple cloud platforms 220 (Cloud 1), 230 (Cloud 2) and 240 (Cloud 3). Cloud platform 220 has separate worker processes, e.g., workers 222-1, 222-2, 222-3 and 222-4. Cloud platform 230 has separate worker processes, e.g., workers 232-1, 232-2, 232-3 and 232-4. Cloud platform 240 has separate worker processes, e.g., workers 242-1, 242-2, 242-3 and 242-4. The training model 212 is run against the training data set 214 on each of the cloud platform 220, 230 and 240. The enterprise can then decide which cloud platform or platforms best execute the training model 212 against the training data set 214 based on some predetermined evaluation criteria.

As described above, there are a variety of ways to transfer training data sets and training models from a master node of a private cloud to the workers in a given public cloud. One approach is to transfer the training data set and the training model to each worker, while another is to transfer the training data set/training model (once) to a shared location available to all the workers.

The following problems arise with respect to transferring the training model and training data set. Note that many of these problems are common to workers that run within the context of one cloud as well as across multiple clouds.

Wait Time for Worker Start

Each worker must wait for the receipt of the entire training model and entire training data set before they can start. This increases the overall completion time of the analytic system (e.g., the training window takes longer to complete).

Data Duplication

Should the system transfer identical copies of the training data set to each worker, a penalty will be paid for: (a) the cost of multiple network transfers; and (b) the cost of duplicate data storage.

Latency for Shared Storage

Should the system place the training data set on a shared storage location available to all the workers, this shared location may not have ideal latency characteristics, especially in environments where workers are distributed across multiple clouds.

Preservation of Worker Results

As workers complete their runs and return results (e.g., parameters) to a master node, the record of these results is often lost. Preservation of these results on a per-worker basis can be used for a variety of purposes, not the least of which is to serve as a permanent record of how quickly the worker came up with their results, and what those results were.

Visibility of Cross-Worker Results

Worker results may be visible to the master node but not to other workers. This prevents slower workers from recognizing delays in their processing (as opposed to the faster workers) and also prohibits them from taking corrective action based on this knowledge.

Specialized Application Programming Interfaces (APIs) for Multi-Cloud Targets

When dealing with multiple cloud provider targets, each target platform has their own nuances for file transfer and collection of results, these nuances become limiting and often require specialized coding, which can slow down implementation and/or introduce errors into the process.

Multi-Cloud Pipelining of Models

Figure 3:
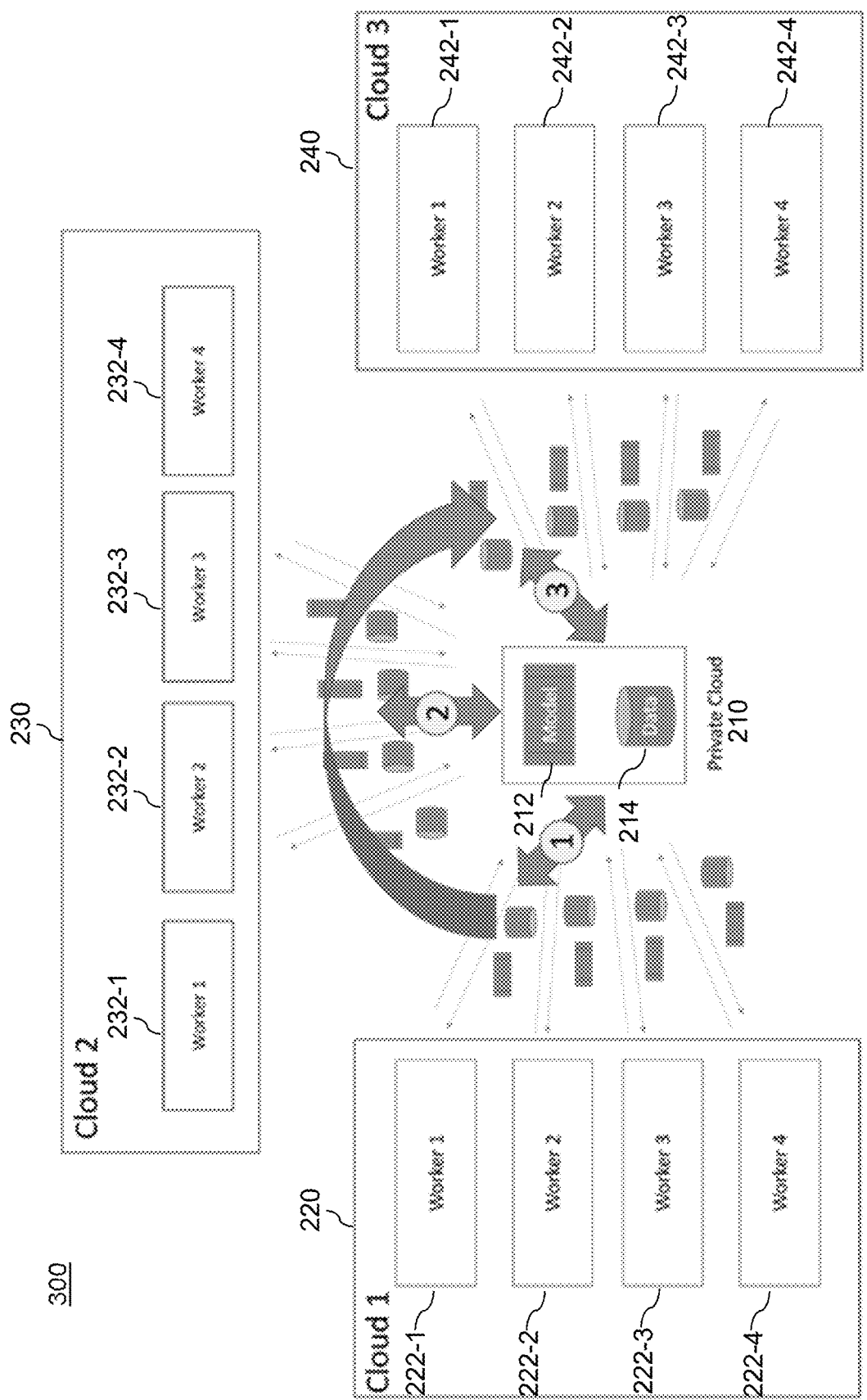
FIG. 3 illustrates a pipelined analytic workflow in a multi-cloud training system with multiple public cloud platforms with which one or more illustrative embodiments may be implemented.

The output of one public cloud analytic model may then be fed into a model (different or the same) running on a different cloud. FIG. 3 illustrates an example 300 of 3-step pipelined flow in the multi-cloud training system 200 with the multiple public cloud platforms depicted in FIG. 2. The flow sequential starts with the model 212 running on the data set 214 in cloud platform 220 (step 1), then the results of cloud platform 220 are fed into cloud platform 230 (step 2), and then the results of cloud platform 230 are fed into cloud platform 240 (step 3). It is realized that the 3-step pipelined flow in FIG. 3 is similarly complex to implement.

Illustrative embodiments overcome the above and other challenge in existing training systems by providing a decentralized file system and message bus architecture.

Figure 4:
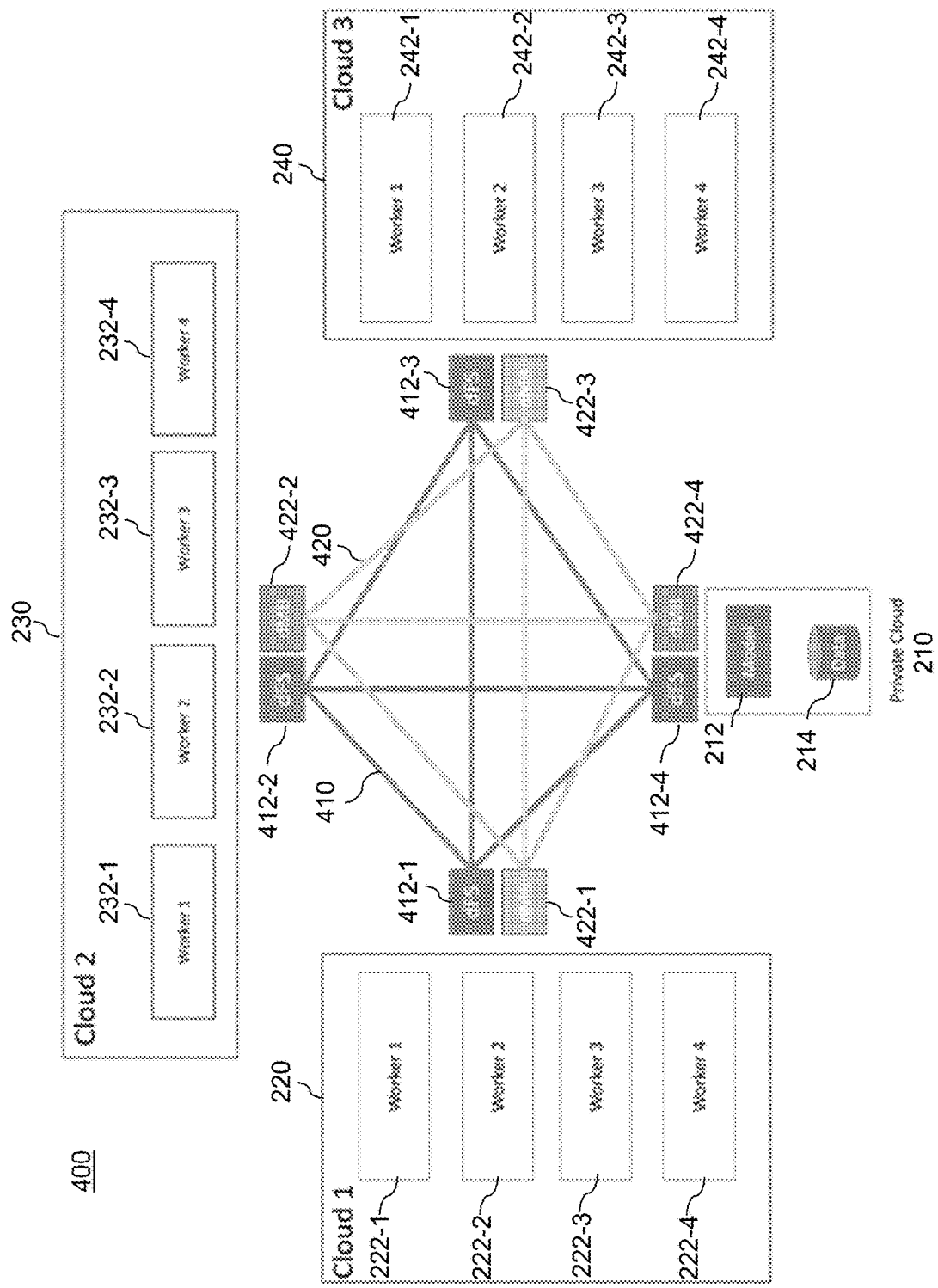
FIG. 4 illustrates a decentralized file system and message bus for use with a pipelined analytic workflow in a multi-cloud training system with multiple public cloud platforms, according to an illustrative embodiment.

FIG. 4 illustrates a decentralized file system and message bus architecture 400 for use with a pipelined analytic workflow in a multi-cloud training system with multiple public cloud platforms, according to an illustrative embodiment. More particularly, a decentralized file system namespace (e.g., Interplanetary File System as will be explained below) is created that spans clouds, and a decentralized message bus (e.g., a blockchain, or RabbitMQ-type framework, as will be explained below) is used for messaging to perform multi-cloud and intercloud analytic jobs. Note that FIG. 4 uses the multi-cloud training system 200 to illustrate the decentralized file system and message bus architecture. However, it is to be appreciated that embodiments are not limited to the configuration of multi-cloud training system 200.

As shown in FIG. 4, decentralized file system 410 comprises a connected network of decentralized file system (dFS) nodes wherein each cloud platform in the multi-cloud training system has a dFS node associated therewith. More particularly, dFS node 412-1 is associated with public cloud platform 220, dFS node 412-2 is associated with public cloud platform 230, dFS node 412-3 is associated with public cloud platform 240, and dFS node 412-4 is associated with private cloud platform 210. The decentralized file system 410 can have more or less dFS nodes than shown in FIG. 4.

Further, as shown in FIG. 4, decentralized message bus 420 comprises a connected network of decentralized message bus (dMB) nodes wherein each cloud platform in the multi-cloud training system has a dMB node associated therewith. More particularly, dMB node 422-1 is associated with public cloud platform 220, dMB node 422-2 is associated with public cloud platform 230, dMB node 422-3 is associated with public cloud platform 240, and dMB node 422-4 is associated with private cloud platform 210. The decentralized message bus 420 can have more or less dMB nodes than shown in FIG. 4.

It is to be appreciated that one or more computing devices at each of the cloud platforms may implement each dFS node and each dMB node.

In one or more illustrative embodiments, the decentralized file system and message bus architecture 400 can be implemented using a decentralized ledger or blockchain network (or RabbitMQ-type framework) and a decentralized data sharing system such as the Interplanetary File System (IPFS) protocol. That is, in illustrative embodiments, the dMB nodes and the dFS nodes in FIG. 4 are respectively configured to support blockchain and IPFS technologies. Before describing illustrative operations and advantages associated with the decentralized file system and message bus architecture 400, some general concepts associated with the blockchain and IPFS technologies will first be described.

As used herein, the terms "blockchain," "digital ledger" and "blockchain digital ledger" may be used interchangeably. As is known, the blockchain or digital ledger protocol is implemented via a distributed, decentralized computer network of compute nodes (e.g., dMB nodes in FIG. 4). The compute nodes are operatively coupled in a peer-to-peer communications protocol. In the computer network, each compute node is configured to maintain a blockchain which is a cryptographically secured record or ledger of data blocks that represent respective transactions within a given computational environment. The blockchain is secured through use of a cryptographic hash function. A cryptographic hash function is a cryptographic function which takes an input (or "message") and returns a fixed-size alphanumeric string, which is called the hash value (also a message digest, a digital fingerprint, a digest, or a checksum). Each blockchain is thus a growing list of data records hardened against tampering and revision, and typically includes a timestamp, current transaction data, and information linking it to a previous block. More particularly, each subsequent block in the blockchain is a data block that includes a given transaction(s) and a hash value of the previous block in the chain, i.e., the previous transaction. That is, each block is typically a group of transactions. Thus, advantageously, each data block in the blockchain represents a given set of transaction data plus a set of all previous transaction data.

In the case of a "bitcoin" implementation of a blockchain distributed ledger, the blockchain contains a record of all previous transactions that have occurred in the bitcoin network. The bitcoin system was first described in S. Nakamoto, "Bitcoin: A Peer to Peer Electronic Cash System," 2008, the disclosure of which is incorporated by reference herein in its entirety.

A key principle of the blockchain is that it is trusted. That is, it is critical to know that data in the blockchain has not been tampered with by any of the compute nodes in the computer network (or any other node or party). For this reason, a cryptographic hash function is used. While such a hash function is relatively easy to compute for a large data set, each resulting hash value is unique such that if one item of data in the blockchain is altered, the hash value changes. However, it is realized that given the constant generation of new transactions and the need for large scale computation of hash values to add the new transactions to the blockchain, the blockchain protocol rewards compute nodes that provide the computational service of calculating a new hash value. In the case of a Bitcoin network, a predetermined number of bitcoins are awarded for a predetermined amount of computation. The compute nodes thus compete for bitcoins by performing computations to generate a hash value that satisfies the blockchain protocol. Such compute nodes are referred to as "miners." Performance of the computation of a hash value that satisfies the blockchain protocol is called "proof of work." While bitcoins are one type of reward, blockchain protocols can award other measures of value (monetary or otherwise) to successful miners.

It is to be appreciated that the above description represents an illustrative implementation of the blockchain protocol and that embodiments of the invention are not limited to the above or any particular blockchain protocol implementation. As such, other appropriate processes may be used to securely maintain and add to a set of data in accordance with embodiments of the invention. For example, distributed ledgers such as, but not limited to, R3 Corda, Ethereum, and Hyperledger may be employed in alternative embodiments.

As mentioned above, a data sharing system such as the IPFS protocol may be employed in the decentralized file system and message bus architecture 400. IPFS is an open-source protocol that provides a decentralized method of storing and sharing files relying on a content-addressable, peer-to-peer hypermedia distribution. The compute nodes in an IPFS network form a distributed file system. The IPFS protocol was developed to replace the HyperText Transfer Protocol (HTTP) of the Internet which relies on location addressing (i.e., using Internet Protocol (IP) addresses to identify the specific computing resource that is hosting a desired data set). As such, the subject data set must be retrieved from the computing resource where it originated or some computing resource within the content delivery network (CDN) each time the data set is requested.

IPFS operates by operatively coupling computing resources with the same system of files via a system of nodes (e.g., dFS nodes in FIG. 4). More particularly, IPFS uses a distributed hash table (DHT) with a block exchange (BitSwap) and namespace methodology that operates across disparate devices and unreliable networks. IPFS operates similarly to a torrent system, except that rather than exchanging media, IPFS exchanges objects based on a a key-value data store. Any type of content can be inserted into the data sharing system, and the system returns a key (i.e., in form of hash value) that can be used to retrieve the content from a node that has it stored thereon at any time. Accordingly, IPFS is a content addressing protocol instead of a location addressing protocol. That is, the hash value is independent of the origin of the data set and can be hosted anywhere in the system.

In one example, the IFPS system is further described in J. Benet, "IPFS—Content Addressed, Versioned, P2P File System," 2014, the disclosure of which is incorporated by reference herein in its entirety. However, illustrative embodiments are not limited to this particular data sharing system and alternative systems may be employed.

Returning now to FIG. 4, the decentralized file system and message bus architecture 400 enables many operations and advantages, some of which will now be described.

Cloud-Neutral Presentation of Data, Models, and Results

By using the architecture depicted in FIG. 4, the owner of the training models and training data sets (e.g., the enterprise associated with private cloud platform 210) can simply maintain one or more local folders for the training data set and the training model. However, since the file system is implemented as a decentralized file system, any file stored into the local folder is addressable to the other cloud providers via the dFS 410.

This feature solves a number of problems including, but not limited to, the amount of time it would take to transfer the entire file to one (or more) of the cloud providers. It also addresses many of the manageability issues that go along with these file transfers (e.g., account addresses, permissions, etc.).

Figure 5:
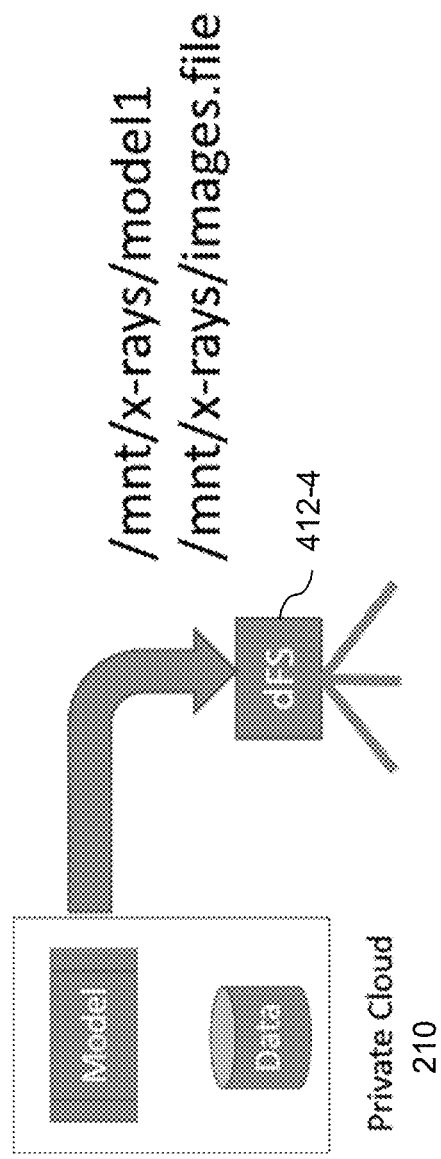
FIG. 5 illustrates a process for loading models and data into a decentralized file system, according to an illustrative embodiment.

FIG. 5 illustrates a process 500 for loading models and data into a decentralized file system, according to an illustrative embodiment. More particularly, FIG. 5 depicts the placement of a training model (e.g., 212 in FIG. 4) and a training data set (e.g., 214 in FIG. 4) into the dFS 410. In this example, the master node of private cloud platform 210 loads the training model 212 (file referenced as /mnt/x-rays/model1) and the training data set 214 (file referenced as /mnt/x-rays/images.files) into its corresponding dFS node 412-4 in dFS 410 in FIG. 4. Thus, the local folders with the training model and the training data set loaded into 412-4 are addressable to the other cloud providers through their respective dFS nodes. Note also that any corresponding dFS node can also be used to store the results achieved by whichever cloud runs the model, e.g., public cloud platform 220, public cloud platform 230, or public cloud platform 240.

Cloud Neutral Message Bus for Running Models

Figure 6:
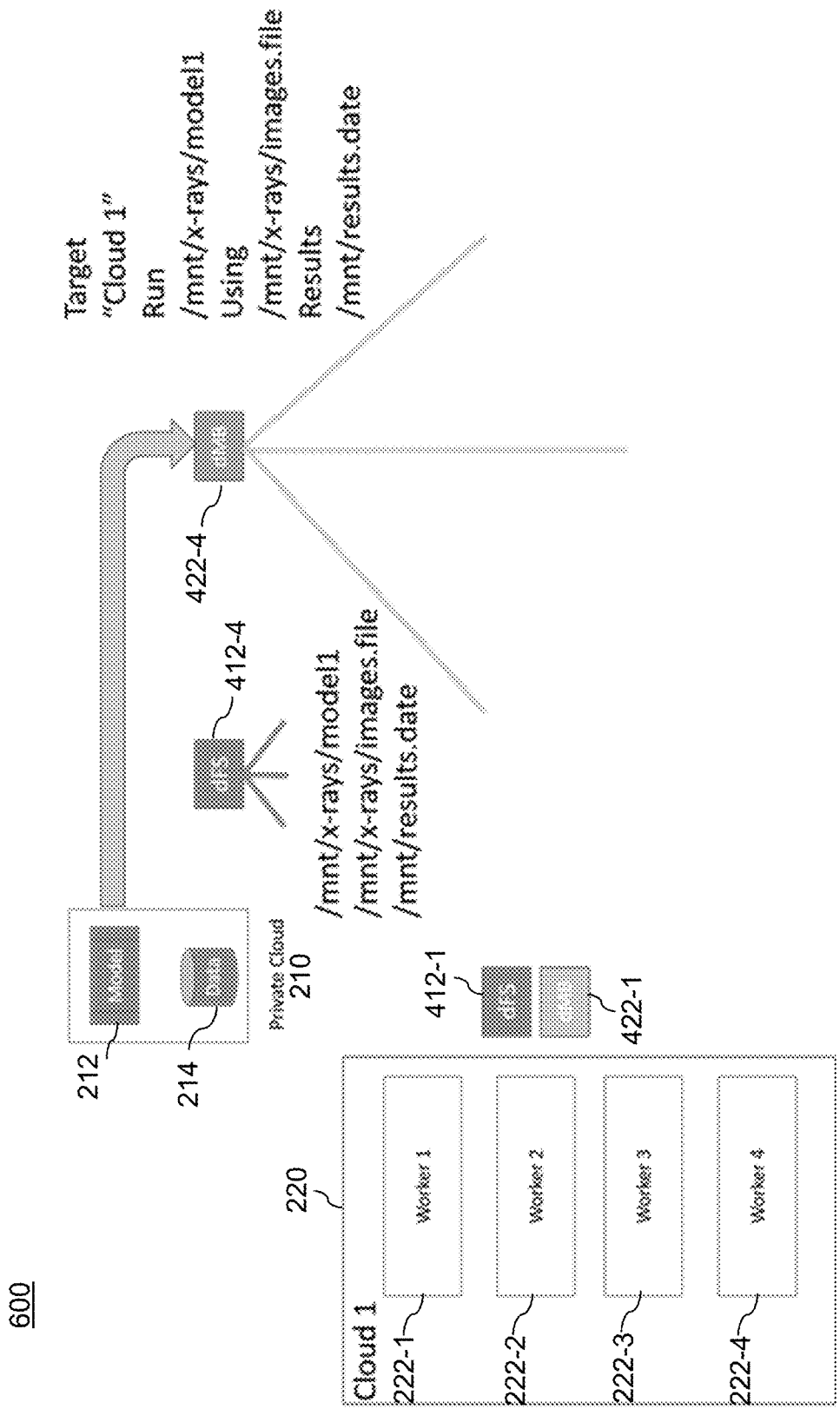
FIG. 6 illustrates a process for inserting a multi-cloud analytic request into a decentralized message bus, according to an illustrative embodiment.

Once a training model and a training data set have been loaded into a dFS node of dFS 410, the owner that wishes to run the model can simply insert a message into the decentralized message bus 420 (FIG. 4) to initiate a run (i.e., execution of the training model against the training data set). FIG. 6 illustrates a process 600 for inserting a multi-cloud analytic request into a decentralized message bus, according to an illustrative embodiment. More particularly, FIG. 6 highlights, for example, a request for public cloud platform 220 (Cloud1) to run the training model (/mnt/x-rays/model1) against the training data set (/mnt/x-rays/images.files) and store the results in a "results.date" directory (referenced as /mnt/results.date). As shown, the request message is inserted by the private cloud platform 210 into its corresponding dMB node 422-4, which is received and read by public cloud platform 220 via its corresponding dMB node 422-1. Public cloud platform 220 instantly accesses the training model and training data set that is the subject of the analytic request via its dFS node 412-1.

Instant Launch and Completion/Results

Once a command has been issued to the dMB 420, the target cloud platform instantly begins running the training model against the training data set. This significantly shortens model iteration time for a number of reasons:

(i) The remote cloud does not have to wait for the training model, and the entire training data set, to be transferred over.

(ii) The local user does not have to step through the manual processes involved with transferring the entirety of both files, maintaining/keeping/deleting previous versions, dealing with user accounts, etc.

(iii) Publishing of results is similarly instant; the cloud provider can simply notify the decentralized message bus that the run is complete. Neither the local user or the remote cloud has to manually transfer the results back to the central location.

Reduced Data Transfers/Costs

Training data sets can be large, and the transfer of the entire training data set to a public cloud provider will come with a cost. This is especially wasteful since an analytic training model will likely only access a portion of the training data set (and not the entire file).

Accordingly, in one or more illustrative embodiments of the decentralized file system, only the requested segments of the file are transferred. In addition, once these segments cross over to the public cloud to a specific worker, that worker keeps (or "pins") the segment locally so that it can be shared with other workers. The optimization of only transferring the data (once) that is needed to the public cloud not only speeds up the overall run time but it also reduces the bill that the public cloud provider will send when counting bytes for data transfer.

Figure 7:
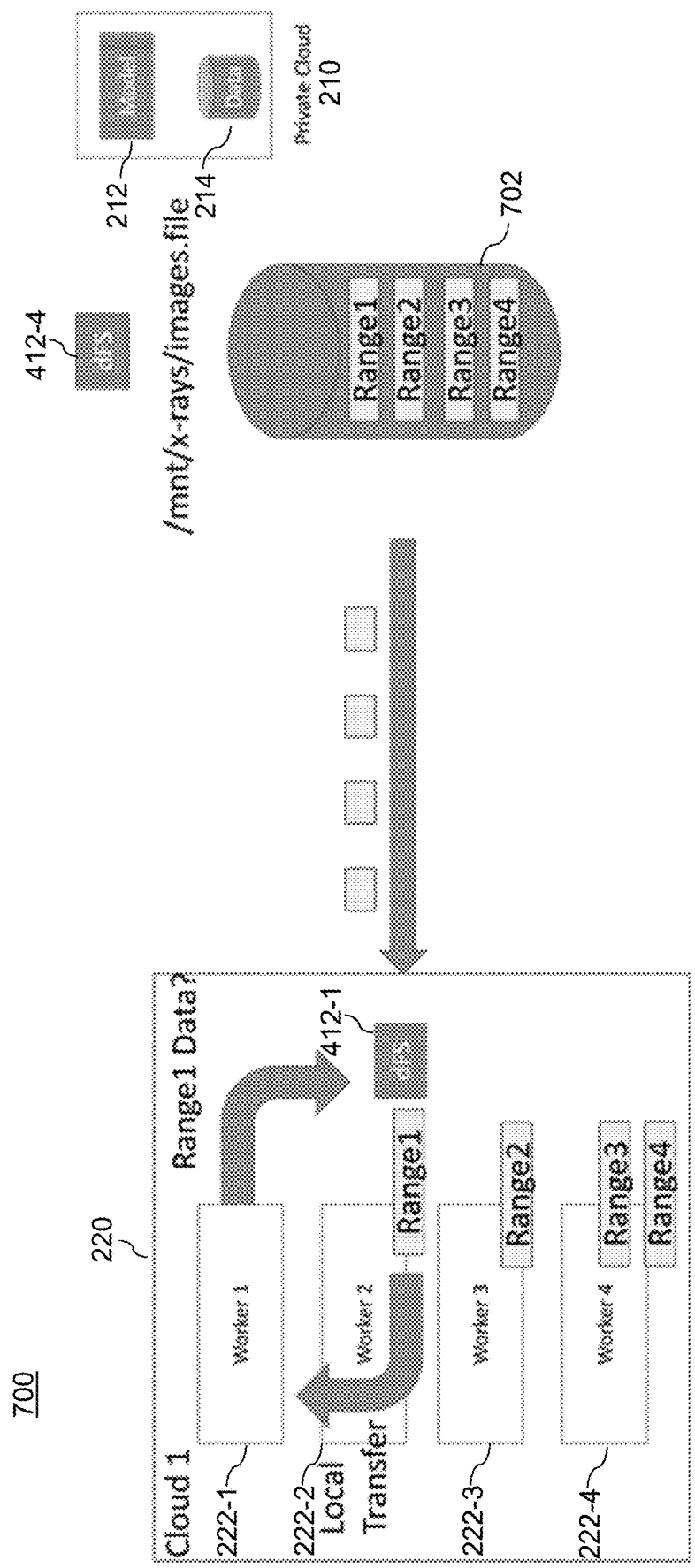
FIG. 7 illustrates a process for data transfer optimization in a decentralized file system, according to an illustrative embodiment.

FIG. 7 illustrates a process 700 for data transfer optimization in a decentralized file system, according to an illustrative embodiment. More particularly, FIG. 7 highlights the above-mentioned optimization wherein only the requested segments of the file are transferred. As shown, a complete training data set (/mnt/x-rays/images.file) is stored in a local file system mount 702 associated with the dFS node 412-4 of the private cloud platform 210. The workers 222-1, 222-2, 222-3 and 222-4 in public cloud platform 220 begin running a training model against this training data set, and begin to request portions of the training data set (e.g. Ranges 1-4). In an illustrative embodiment (e.g., IPFS), only those requested portions (and super-set segments) are sent over the dFS 410 (which reduces bandwidth charges that public cloud platform 220 may charge).

If any of the workers 222-1, 222-2, 222-3 and 222-4 in public cloud platform 220 request a data segment that has already been stored in the dFS node 412-1 (e.g., worker 222-1 requesting "Range1" in FIG. 7), this request can be satisfied from within the cloud by worker 222-2. This also reduces the amount of bandwidth that the public cloud provider needs to transfer.

Efficient Pipelining

Figure 8:
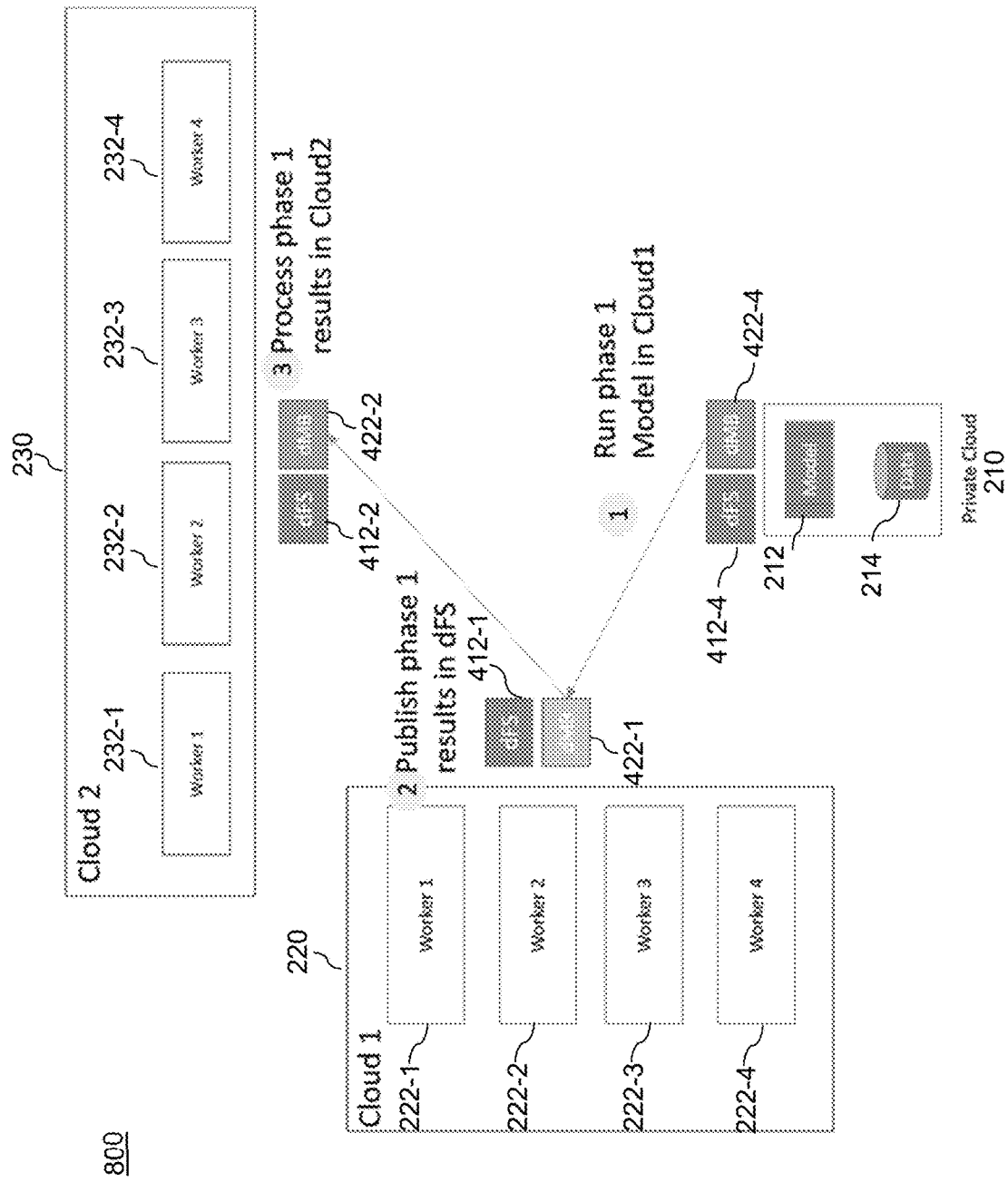
FIG. 8 illustrates a process for multi-cloud pipelined analytic processing in a decentralized file system, according to an illustrative embodiment.

As multi-stage analytic jobs execute across multiple cloud platforms, the intermediate published results can simply be placed in a dFS folder and a message signaled to the next cloud via the dMB. This eliminates the bottleneck of pushing results back to a central arbiter (e.g., master node of the private cloud platform 210), which in turn pushes these results (and additional data) to the next processing cloud in the pipeline. FIG. 8 highlights this pipelining sequence.

More particularly, FIG. 8 illustrates a process 800 for multi-cloud pipelined analytic processing in a decentralized file system, according to an illustrative embodiment. As shown, the private cloud platform 210 sends a message via its dMB node 422-4 to the dMB node 422-1 of public cloud platform 220 to run phase 1 execution on the training model. The results of phase 1 are published in the dFS and the dMB node 422-1 of public cloud platform 220 sends a message to the dMB node 422-2 of public cloud platform 230 to run phase 2 execution on the phase 1 results. Such publishing and messaging can continue with other cloud platforms in the system to extend the analytic pipeline processing operation as needed.

FIG. 9 illustrates a methodology for providing a decentralized file system and message bus architecture in a multi-cloud training system, according to an illustrative embodiment. In FIG. 9, methodology 900 comprises the following steps. In a multi-cloud computing environment comprising a plurality of cloud platforms, wherein one cloud platform of the plurality of cloud platforms is a source of a model and a data set and further wherein the model is to be executed against the data set on one or more of the other cloud platforms of the plurality of cloud platforms, step 902 maintains a decentralized architecture comprising a file system and a message bus, wherein the file system comprises a plurality of decentralized file system nodes corresponding to the plurality of cloud platforms, and the message bus comprises a plurality of decentralized message bus nodes corresponding to the plurality of cloud platforms. Further, step 904 manages sharing of the model and the data set via at least a portion of the decentralized file system nodes and manages messaging related to execution of the model against the data set via at least a portion of the decentralized message bus nodes.

At least portions of the decentralized file system and message bus architecture shown in FIGS. 4-8 may be implemented using one or more processing platforms associated with one or more information processing systems. In some embodiments, a given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one. In many embodiments, logic may be executed across one or more physical or virtual processors. In certain embodiments, a virtual processor may be mapped to and executed on or across a portion of one or more virtual or physical processors. An illustrative embodiment of a processing platform will now be described in greater detail in conjunction with FIG. 10.

As is apparent from the above, one or more of the processing modules or other components of the decentralized file system and message bus architecture shown in FIGS. 4-8 may each run on a computer, server, storage device or other processing platform element. A given such element may be viewed as an example of what is more generally referred to herein as a "processing device." An example of such a processing platform is processing platform 1000 shown in FIG. 10.

The processing platform 1000 in this embodiment comprises a plurality of processing devices, denoted 1002-1, 1002-2, 1002-3, . . . 1002-N, which communicate with one another over a network 1004.

The network 1004 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

As mentioned previously, some networks utilized in a given embodiment may comprise high-speed local networks in which associated processing devices communicate with one another utilizing Peripheral Component Interconnect Express (PCIe) cards of those devices, and networking protocols such as InfiniBand, Gigabit Ethernet or Fibre Channel.

The processing device 1002-1 in the processing platform 1000 comprises a processor 1010 coupled to a memory 1012.

The processor 1010 may comprise a microprocessor, a microcontroller, an application-specific integrated circuit (ASIC), a field-programmable gate array (FPGA) or other type of processing circuitry, as well as portions or combinations of such circuitry elements.

The memory 1012 may comprise random access memory (RAM), read-only memory (ROM) or other types of memory, in any combination. The memory 1012 and other memories disclosed herein should be viewed as illustrative examples of what are more generally referred to as "processor-readable storage media" storing executable program code of one or more software programs.

Articles of manufacture comprising such processor-readable storage media are considered embodiments of the present disclosure. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Figure 10:
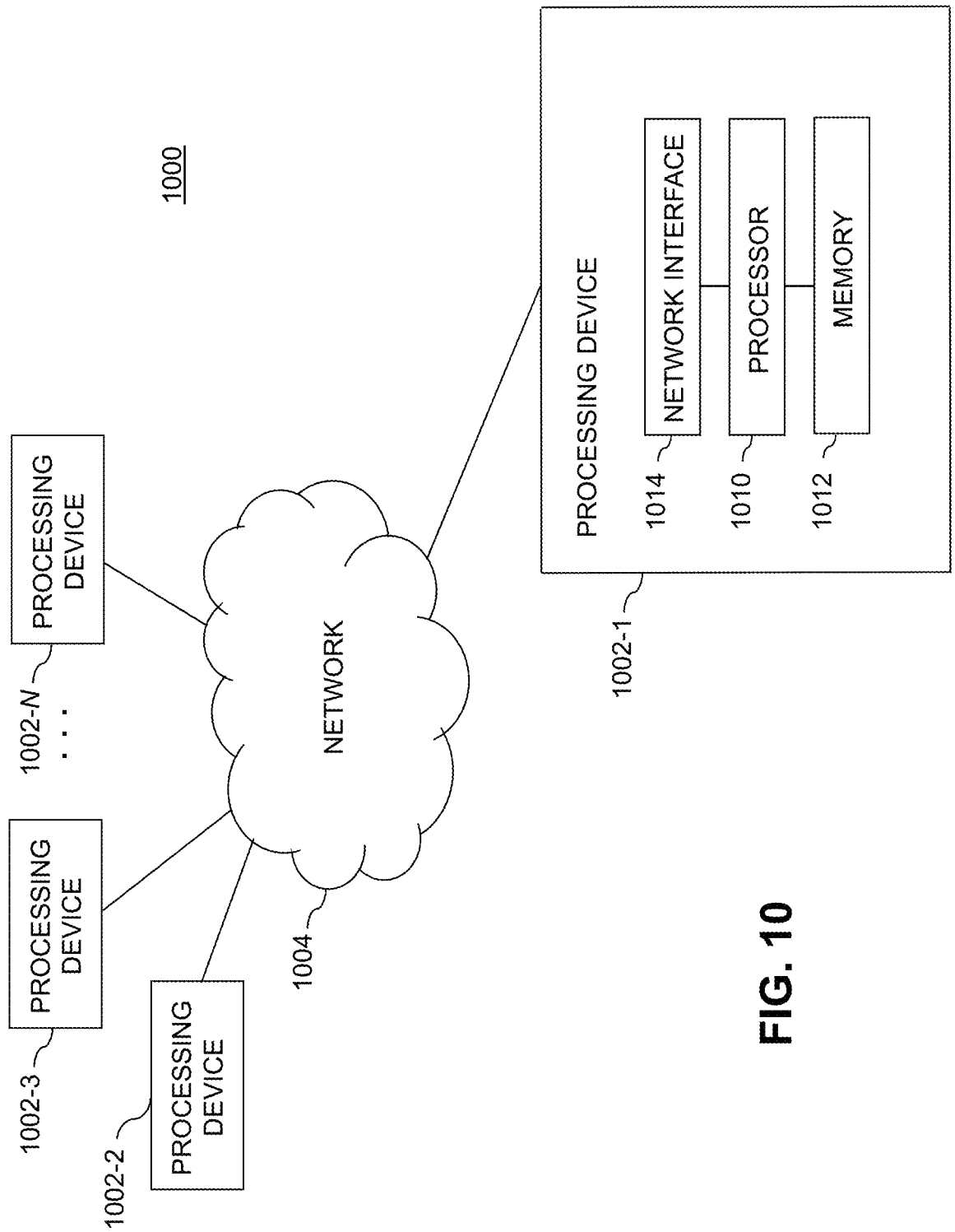
FIG. 10 illustrates a processing platform used to implement a decentralized file system and message bus architecture in a multi-cloud training system, according to an illustrative embodiment.

Also included in the processing device 1002-1 of the example embodiment of FIG. 10 is network interface circuitry 1014, which is used to interface the processing device with the network 1004 and other system components, and may comprise conventional transceivers.

The other processing devices 1002 of the processing platform 1000 are assumed to be configured in a manner similar to that shown for processing device 1002-1 in the figure.

Again, this particular processing platform is presented by way of example only, and other embodiments may include additional or alternative processing platforms, as well as numerous distinct processing platforms in any combination, with each such platform comprising one or more computers, servers, storage devices or other processing devices.

For example, other processing platforms used to implement embodiments of the disclosure can comprise different types of virtualization infrastructure, in place of or in addition to virtualization infrastructure comprising virtual machines. Such virtualization infrastructure illustratively includes container-based virtualization infrastructure configured to provide Docker containers or other types of Linux containers (LXCs).

The containers may be associated with respective tenants of a multi-tenant environment, although in other embodiments a given tenant can have multiple containers. The containers may be utilized to implement a variety of different types of functionality within the system. For example, containers can be used to implement respective cloud compute nodes or cloud storage nodes of a cloud computing and storage system. The compute nodes or storage nodes may be associated with respective cloud tenants of a multi-tenant environment. Containers may be used in combination with other virtualization infrastructure such as virtual machines implemented using a hypervisor.

As another example, portions of a given processing platform in some embodiments can comprise converged infrastructure such as VxRail™, VxRack™ or Vblock® converged infrastructure commercially available from VCE, the Virtual Computing Environment Company, now the Converged Platform and Solutions Division of Dell EMC. For example, portions of a system of the type disclosed herein can be implemented utilizing converged infrastructure.

It should therefore be understood that in other embodiments different arrangements of additional or alternative elements may be used. In many embodiments, at least a subset of these elements may be collectively implemented on a common processing platform, or each such element may be implemented on a separate processing platform.

Also, in other embodiments, numerous other arrangements of computers, servers, storage devices or other components are possible in the decentralized file system and message bus architecture. Such components can communicate with other elements of the system over any type of network or other communication media.

As indicated previously, in some embodiments, components of the decentralized file system and message bus architecture as disclosed herein can be implemented at least in part in the form of one or more software programs stored in memory and executed by a processor of a processing device. For example, at least portions of the dFS, the dMB, or other system components are illustratively implemented in one or more embodiments in the form of software running on a processing platform comprising one or more processing devices.

It should again be emphasized that the above-described embodiments of the disclosure are presented for purposes of illustration only. Many variations and other alternative embodiments may be used. For example, the disclosed techniques are applicable to a wide variety of other types of systems. Also, the particular configurations of system and device elements, associated processing operations and other functionality illustrated in the drawings can be varied in other embodiments. Moreover, the various assumptions made above in the course of describing the illustrative embodiments should also be viewed as exemplary rather than as requirements or limitations of the embodiments. Numerous other alternative embodiments within the scope of the appended claims will be readily apparent to those skilled in the art.

What is claimed is:

1. A method comprising:
in a given cloud platform comprising a source of a model and a data set, the given cloud platform communicating with a multi-cloud computing environment comprising one or more of other cloud platforms, the given cloud platform:
storing the model and the data set as one or more local files;
maintaining a given decentralized file system node and a given decentralized message bus node of a decentralized architecture of the multi-cloud computing environment, the decentralized architecture comprising a file system and a message bus;
sharing the model and the data set with the one or more of the other cloud platforms via the given decentralized file system node;
sending one or more messages related to execution of the model against the data set to the one or more of the other cloud platforms via the given decentralized message bus node, the one or more messages comprising instructions regarding execution of the model against the data set to enable execution across the one or more of the other cloud platforms;
enabling, via the given decentralized file system node, access to and receipt of first results of the execution of the model against the data set by a first execution cloud platform of the one or more of the other cloud platforms; and
enabling, via the given decentralized file system node, access to and receipt of second results of at least a subsequent execution of the model against the data set by a second execution cloud platform of the one or more of the other cloud platforms;
wherein the message bus comprises a distributed ledger system;
wherein the file system comprises a content address-based distributed file system; and
wherein the method is implemented via one or more processing devices each comprising a processor coupled to a memory.

2. The method of claim 1, further comprising the given decentralized file system node of the given cloud platform receiving the model and the data set from the given cloud platform.

3. The method of claim 2, further comprising the given decentralized file system node of the given cloud platform enabling access of the model and the data set to a first decentralized file system node of the first execution cloud platform of the one or more of the other cloud platforms to permit execution of the model against the data set by the first execution cloud platform.

4. The method of claim 3, further comprising receiving by the given decentralized message bus node of the given cloud platform a message through a first decentralized message bus node of the first execution cloud platform indicating availability of the first results.

5. The method of claim 1, wherein the model comprises a training model in the form of an analytic algorithm and wherein the data set against which the model is executed is a training data set.

6. The method of claim 3, further comprising receiving by the given decentralized message bus node of the given cloud platform a message through a second decentralized message bus node of the second execution cloud platform indicating availability of the second results.

7. The method of claim 1, wherein:
the given cloud platform comprises one or more private cloud platforms; and
each of the first execution cloud platform and the second execution cloud platform comprises one or more public cloud platforms.

8. An article of manufacture comprising a non-transitory processor-readable storage medium having stored therein program code of one or more software programs, wherein the program code when executed by at least one processing device causes said at least one processing device to:
in a given cloud platform comprising a source of a model and a data set, the given cloud platform communicating with a multi-cloud computing environment comprising one or more of other cloud platforms;
store the model and the data set as one or more local files;
maintain a given decentralized file system node and a given decentralized message bus node of a decentralized architecture of the multi-cloud computing environment, the decentralized architecture comprising a file system and a message bus;
share the model and the data set with the one or more of the other cloud platforms via the given decentralized file system node;
send one or more messages related to execution of the model against the data set to the one or more of the other cloud platforms via the given decentralized message bus node, the one or more messages comprising instructions regarding execution of the model against the data set to enable execution across the one or more of the other cloud platforms;
enable, via the given decentralized file system node, access to and receipt of first results of the execution of the model against the data set by a first execution cloud platform of the one or more of the other cloud platforms; and
enable, via the given decentralized file system node, access to and receipt of second results of at least a subsequent execution of the model against the data set by a second execution cloud platform of the one or more of the other cloud platforms;
wherein the message bus comprises a distributed ledger system; and
wherein the file system comprises a content address-based distributed file system.

9. The article of manufacture of claim 8, further comprising the given decentralized file system node of the given cloud platform receiving the model and the data set from the given cloud platform.

10. The article of manufacture of claim 9, further comprising the given decentralized file system node of the given cloud platform enabling access of the model and the data set to a first decentralized file system node of the first execution cloud platform of the one or more of the other cloud platforms to permit execution of the model against the data set by the first execution cloud platform.

11. The article of manufacture of claim 10, further comprising receiving by the given decentralized message bus node of the given cloud platform a message through a first decentralized message bus node of the first execution cloud platform indicating availability of the first results.

12. The article of manufacture of claim 8, wherein the model comprises a training model in the form of an analytic algorithm and wherein the data set against which the model is executed is a training data set.

13. The article of manufacture of claim 11, further comprising receiving by the given decentralized message bus node of the given cloud platform a message through a second decentralized message bus node of the second execution cloud platform indicating availability of the second results.

14. The article of manufacture of claim 8, wherein:
the given cloud platform comprises one or more private cloud platforms; and
each of the first execution cloud platform and the second execution cloud platform comprises one or more public cloud platforms.

15. A system comprising:
in a given cloud platform comprising a source of a model and a data set, the given cloud platform communicating with a multi-cloud computing environment comprising one or more of other cloud platforms;
one or more processing devices configured to:
store the model and the data set as one or more local files;
maintain a given decentralized file system node and a given decentralized message bus node of a decentralized architecture of the multi-cloud computing environment, the decentralized architecture comprising a file system and a message bus;
share the model and the data set with the one or more of the other cloud platforms via the given decentralized file system node;
send one or more messages related to execution of the model against the data set to the one or more of the other cloud platforms via the given decentralized message bus node, the one or more messages comprising instructions regarding execution of the model against the data set to enable execution across the one or more of the other cloud platforms;
enable, via the given decentralized file system node, access to and receipt of first results of the execution of the model against the data set by a first execution cloud platform of the one or more of the other cloud platforms; and
enable, via the given decentralized file system node, access to and receipt of second results of at least a subsequent execution of the model against the data set by a second execution cloud platform of the one or more of the other cloud platforms;
wherein the message bus comprises a distributed ledger system; and wherein the file system comprises a content address-based distributed file system.

16. The system of claim 15, further comprising the given decentralized file system node of the given cloud platform receiving the model and the data set from the given cloud platform.

17. The system of claim 16, further comprising the given decentralized file system node of the given cloud platform enabling access of the model and the data set to a first decentralized file system node of the first execution cloud platform of the one or more of the other cloud platforms to permit execution of the model against the data set by the first execution cloud platform.

18. The system of claim 17, further comprising receiving by the given decentralized message bus node of the given cloud platform a message through a first decentralized message bus node of the first execution cloud platform indicating availability of the first results.

19. The system of claim 18, further comprising receiving by the given decentralized message bus node of the given cloud platform a message through a second decentralized message bus node of the second execution cloud platform indicating availability of the second results.

20. The system of claim 15, wherein:
- the given cloud platform comprises one or more private cloud platforms; and
- each of the first execution cloud platform and the second execution cloud platform comprises one or more public cloud platforms.

\* \* \* \* \*